US012018977B2

(12) United States Patent
Yamada et al.

(10) Patent No.: US 12,018,977 B2
(45) Date of Patent: Jun. 25, 2024

(54) COMBINATION WEIGHING DEVICE

(71) Applicant: Yamato Scale Co., Ltd., Hyogo (JP)

(72) Inventors: Junya Yamada, Hyogo (JP); Ryo Tokuhira, Hyogo (JP)

(73) Assignee: YAMATO SCALE CO., LTD., Akashi (JP)

( * ) Notice: Subject to any disclaimer, the term of this patent is extended or adjusted under 35 U.S.C. 154(b) by 567 days.

(21) Appl. No.: 17/286,415

(22) PCT Filed: Dec. 17, 2019

(86) PCT No.: PCT/JP2019/049360
§ 371 (c)(1),
(2) Date: Apr. 16, 2021

(87) PCT Pub. No.: WO2020/129967
PCT Pub. Date: Jun. 25, 2020

(65) Prior Publication Data
US 2021/0389170 A1    Dec. 16, 2021

(30) Foreign Application Priority Data

Dec. 20, 2018  (JP) .................................. 2018-238258

(51) Int. Cl.
*G01G 19/393* (2006.01)
*G01G 21/28* (2006.01)

(52) U.S. Cl.
CPC .......... *G01G 19/393* (2013.01); *G01G 21/28* (2013.01)

(58) Field of Classification Search
CPC ............................ G01G 19/393; G01G 21/28

USPC ........................................................ 177/103
See application file for complete search history.

(56) References Cited

U.S. PATENT DOCUMENTS

| | | | | |
|---|---|---|---|---|
| 4,340,216 A * | 7/1982 | Murphy | ................ | F16C 19/507 |
| | | | | 212/337 |
| 4,660,661 A * | 4/1987 | Yamano | ................ | G01G 19/393 |
| | | | | 177/1 |
| 4,782,454 A * | 11/1988 | Nakamura | ........... | G05D 11/001 |
| | | | | 702/129 |
| 5,875,859 A * | 3/1999 | Ikeda | ....................... | E21B 7/067 |
| | | | | 175/73 |
| 6,437,256 B1 * | 8/2002 | Miyamoto | ........... | G01G 19/393 |
| | | | | 177/25.18 |
| 6,703,568 B2 * | 3/2004 | Wako | .................... | G01G 19/393 |
| | | | | 177/180 |
| 8,525,048 B2 * | 9/2013 | Kawanishi | ........... | G01G 19/393 |
| | | | | 177/25.18 |
| 9,459,133 B2 * | 10/2016 | Nagai | .................. | G01G 19/393 |

(Continued)

FOREIGN PATENT DOCUMENTS

| JP | 2001-050803 A | 2/2001 |
|---|---|---|
| JP | 2005-24454 A | 1/2005 |
| JP | 2008-58263 A | 3/2008 |

(Continued)

*Primary Examiner* — Jacques M Saint Surin
(74) *Attorney, Agent, or Firm* — Norris McLaughlin, P.A.

(57) ABSTRACT

In a horizontal combination weighing device in which weighing units are arranged next to each other, a horizontally long base is equipped with the weighing units each including a weighing hopper and is supportably mounted to a support frame in a manner that the base is pivotable around a fulcrum vertically extending at lateral one end of the base.

13 Claims, 10 Drawing Sheets

Front-back direction

(56) References Cited

U.S. PATENT DOCUMENTS

| | | | | |
|---|---|---|---|---|
| 10,018,496 B2* | 7/2018 | Morimoto | ............. | G01G 13/18 |
| 10,557,747 B2* | 2/2020 | Kishikawa | ........... | G01G 19/393 |

FOREIGN PATENT DOCUMENTS

| | | | | |
|---|---|---|---|---|
| JP | 2018-077074 A | | 5/2018 | |
| WO | WO-2012092615 A1 * | | 7/2012 | ........... E05D 11/082 |
| WO | WO-2017159500 A1 * | | 9/2017 | ............. G01G 13/18 |

* cited by examiner

Front-back direction

Lateral direction

Lateral direction

COMBINATION WEIGHING DEVICE

TECHNICAL FIELD

The present invention relates to a combination weighing device for use in mixing and weighing predetermined quantities of different kinds of articles, for example, foodstuffs, snacks and sweets, more particularly to a combination weighing device suitable for use in mixing and weighing, in a small quantity at a time, different kinds of articles that range in a wide variety.

BACKGROUND ART

Patent document 1 describes an example of combination weighing devices that may be suitably used to mix and weigh a broad range of different articles. The combination weighing device described in this patent document is equipped with a large number of weighing units each including a supply hopper and a weighing hopper, and supply units that supply the supply hoppers of the weighing units with articles. The weighing units are linearly arranged next to one another and mounted to side surfaces of a horizontally long center base fixedly installed, and the supply units are mounted to both sides of the center base.

In the combination weighing devices of the known art, the components including the hoppers of the weighing units may be detachably fitted to the center base for maintenance and cleaning when types of articles to be handled in the devices are changed. In the conventional weighing devices horizontally installed in which the weighing units are arranged next to each other, the whole supply units are moved away from the center base to provide an operator with a working space in front of the weighing units.

CITATIONS LIST

Patent Document
Patent Document 1: Japanese Unexamined Patent Publication No. 2018-77074

SUMMARY OF INVENTION

Technical Problems

The supply units may be conventionally equipped with tanks in which a wide variety of articles are retainable, and a larger number of linear feeders arranged next to one another to feed supply hoppers of the respective weighing units with the articles from the tanks. Thus, the supply units including these components are, altogether, considerably heavy, and a great deal of labor may be required to move such a heavy equipment. For example, greater tank capacities may be a great advantage for long-hour automatic operation, which, however, may naturally lead to greater weights of the retainable articles and accordingly demand even greater effort and labor to move such heavier supply units.

The present invention was accomplished to address these issues of the known art and is directed to facilitating, in a horizontal-type combination weighing device in which weighing units are arranged next to each other, cleaning and maintenance operations by allowing the weighing units to be readily opened and exposed without heavy labor.

Technical Solutions

To this end, the present invention provides the following technical features.

1) A combination weighing device according to the present invention includes: a plurality of weighing units each including a weighing hopper, the plurality of weighing units being arranged next to each other; and a base having a long shape in a horizontal direction, the base being mountable with the plurality of weighing units and being pivotable around a vertical fulcrum at one end of the base in the horizontal direction.

According to the present invention, the weighing units arranged next to each other in the base may be exposed to a large extent by having the base pivot around the fulcrum. In this instance, the base, unaffected or least affected by weights of the article-containing tanks and linear feeders, may be readily pivotable. Further advantageously, such exposure of the weighing units may facilitate cleaning and maintenance operations for these units.

2) According to a preferred embodiment of the present invention, the combination weighing device may further include a cross roller bearing that supports a pivoting shaft of the base, the cross roller bearing being disposed at a position below the one end in the horizontal direction.

According to this embodiment, the cross roller bearing supports a lower end of the pivoting shaft of the base, which may allow the pivoting shaft to smoothly pivot against all of possible loads, for example, bending moment load, radial load, and thrust load. Further advantageously, the combination weighing device may be reduced in size as compared to, for example, a structure in which two or more any other bearings but the cross roller bearings are disposed at upper and lower positions of the pivoting shaft.

3) According to an embodiment of the present invention, the combination weighing device may further include a torque hinge allowed to hold the base at an optional pivoting position.

According to this embodiment, the torque hinge imparts a resistance torque against pivoting movement of the base, allowing the base to be held at an optional pivoting position.

4) According to an embodiment of the present invention, the combination weighing device may further include a pivotable range regulator that regulates a range of pivoting of the base.

This embodiment may avoid the risk that the base pivoting beyond a certain range bumps against any mechanical devices nearby.

5) According to a preferred embodiment of the present invention, the combination weighing device may further include two bases configured similarly to the base, the two bases being disposed next to each other in a row in the horizontal direction and being pivotable as in a pair of French windows.

In the combination weighing device, the weighing units may be arranged next to each other horizontally in a long row. According to this embodiment, however, a radius of pivoting of one of the two bases may be substantially smaller than a radius of pivoting in a structure in which the whole weighing units are juxtaposed and mounted to one base.

6) According to another embodiment of the present invention, the combination weighing device may further include a self-lockable locking mechanism that securely engages the base to a predetermined position.

According to this embodiment, the pivotable base, when returned to its originally predetermined position, is automatically locked. This may eliminate the need for an additional burden, for example, fixing the base using screws.

7) According to yet another embodiment of the present invention, the combination weighing device may further include a clamping mechanism that elastically presses, using a clamping tool, the base currently at the predetermined position in a direction in which the base is no longer pivotable.

This embodiment, by elastically pressing the base at the predetermined position using a clamping tool, may allow the weighing units to weigh the articles with higher accuracy without any vibration-caused impact.

8) According to yet another embodiment of the present invention, the clamping mechanism may be shared and used for two bases configured similarly to the base, the two bases being arranged next to each other in a row in the horizontal direction.

According to this embodiment, the clamping mechanism may be structurally simplified as compared to clamping structures equipped in each of the bases. Also, this embodiment may provide improved handleability because the two bases may be clamped and unclamped in a single operation.

Effects of the Invention

According to the present invention, the weighing units of the base arranged next to each other may be exposed to a large extent by having the base pivot around the fulcrum. In this instance, the base, unaffected or least affected by weights of the article-containing tanks and linear feeders, may be readily pivotable, and such exposure of the weighing units may facilitate cleaning and maintenance operations for these units.

DESCRIPTION OF EMBODIMENTS

Embodiments of the present invention are hereinafter described in detail with reference to the accompanying drawings.

Figure 1:
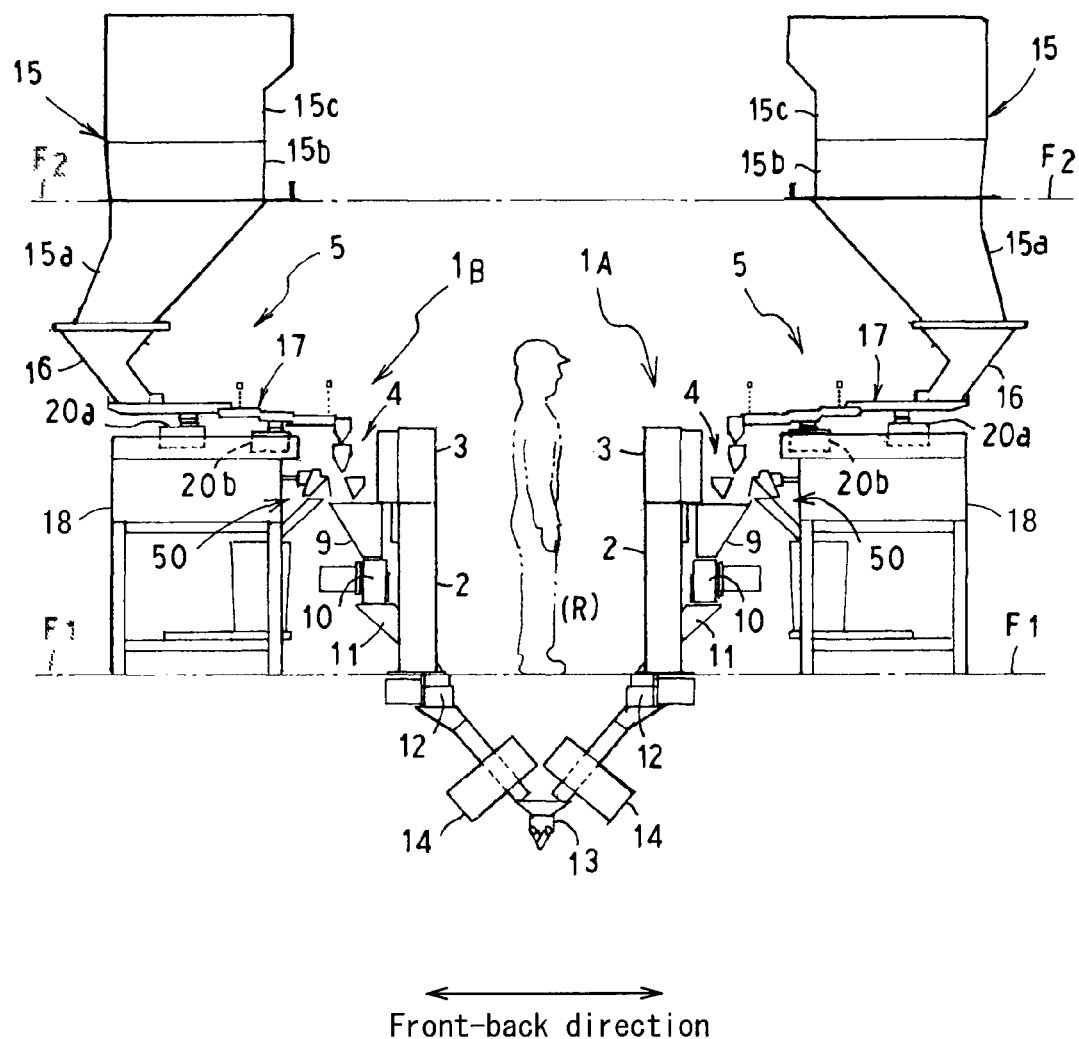
FIG. 1 is a schematic side view of a combination weighing device according to an embodiment of the present invention.
Figure 2:
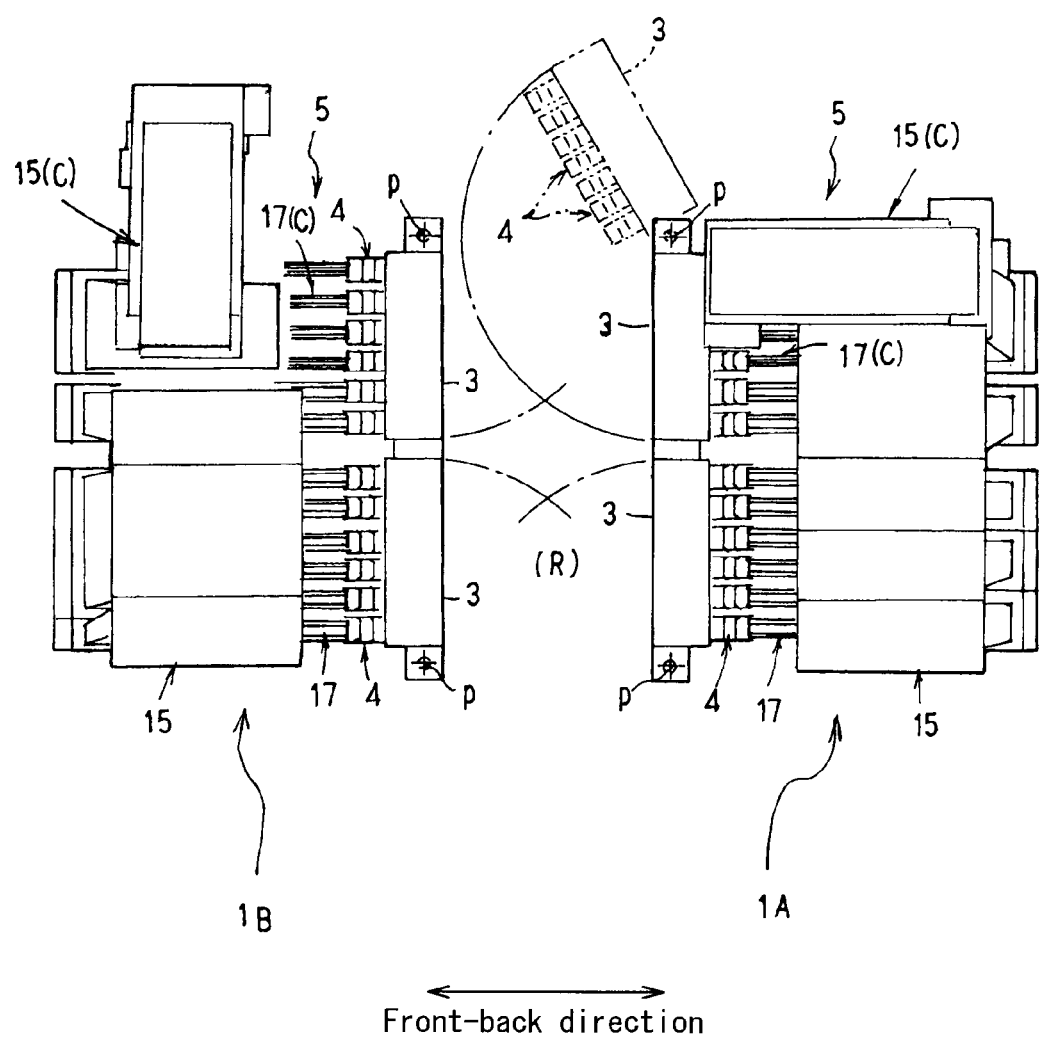
FIG. 2 is a schematic plan view of the combination weighing device illustrated in FIG. 1.
Figure 3:
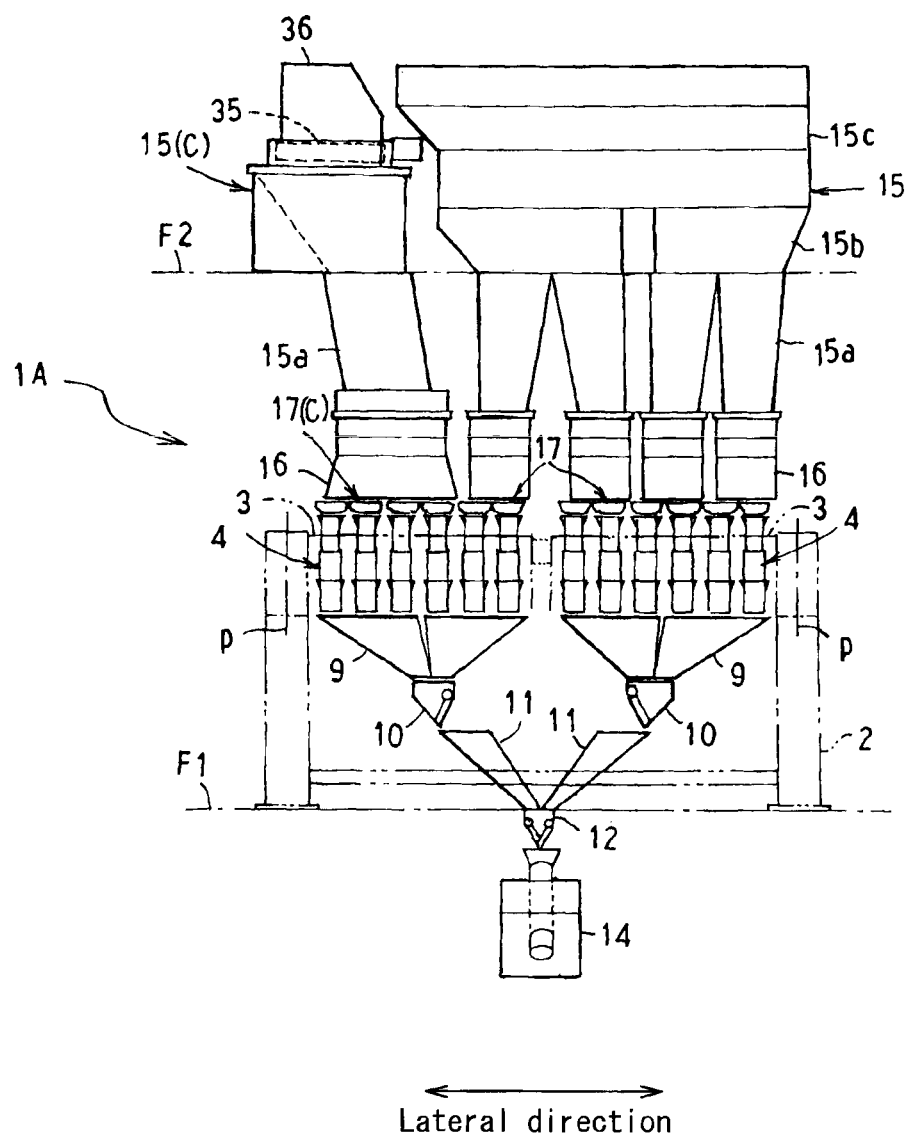
FIG. 3 is a schematic front view of one of weighing devices illustrated in FIG. 1.
Figure 4:
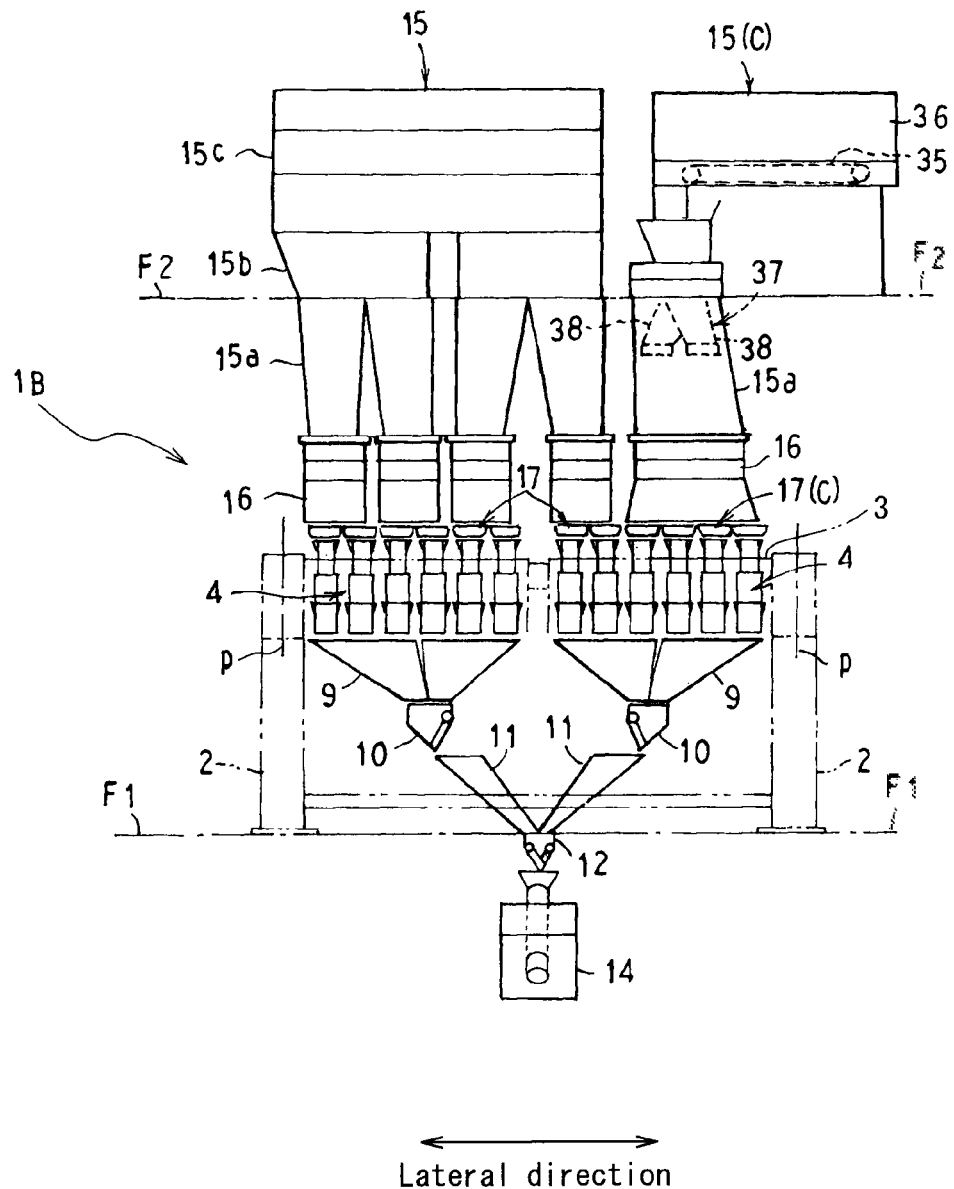
FIG. 4 is a schematic front view of the other weighing device illustrated in FIG. 1.

FIG. 1 is a schematic side view of a combination weighing device according to an embodiment of the present invention. FIG. 2 is a schematic plan view of the combination weighing device. FIGS. 3 and 4 are schematic front views of weighing devices.

The combination weighing device according to this embodiment is for use in mixing and weighing predetermined quantities of articles that range in a wide variety (for example, eight kinds of articles) such as foodstuffs including snacks and sweets.

This combination weighing device is installed on a first floor surface F1 for use in a packaging line, in which weighed articles are thrown in and packed into bags in a packaging apparatus, not illustrated in the drawing, located on a lower level than the floor surface.

For readability of this specification to better understand the structural features of this combination weighing device, a front-back direction is hereinafter used to refer to the transverse direction on the drawings of FIGS. 1 and 2, and the direction from the near to far side on the drawings of FIGS. 3 and 4. Further, a lateral direction is hereinafter used to refer to the direction from the near to far side on the drawing of FIG. 1, and the transverse direction on the drawings of FIGS. 3 and 4.

As illustrated in FIG. 1, the combination weighing device includes a pair of weighing devices 1A and 1B. These weighing devices 1A and 1B are disposed on the front and back sides in a manner that they face each other, with a central passage R being interposed therebetween. An operator of these weighing devices is allowed to move laterally, from right to left and vice versa, through this central passage R. The weighing devices 1A and 1B are essentially configured likewise, structural features of which are hereinafter described.

On the inner sides of the weighing devices 1A and 1B (on the sides of the central passage R), two bases 3 are each disposed on a support frame 2 vertically disposed on the first floor surface F1 and thereby stands to a predetermined height. The bases 3 are disposed so as to extend in the lateral direction. On the outer sides of the bases 3 (on the sides opposite to the central passage R), multiple weighing units 4 are disposed in a row in the lateral direction. In the illustrated example, the weighing devices 1A and 1B are each equipped with 12 weighing units 4 that are lined up in a row. A wide variety of articles may be successfully mixed and weighed with these 24 weighing units 4, in total, of the weighing devices 1A and 1B.

An article supplier 5 is disposed on the outer side of the weighing units 4. The article supplier 5 supplies various kinds of articles to be weighed to positions above the weighing units 4.

Figure 5:
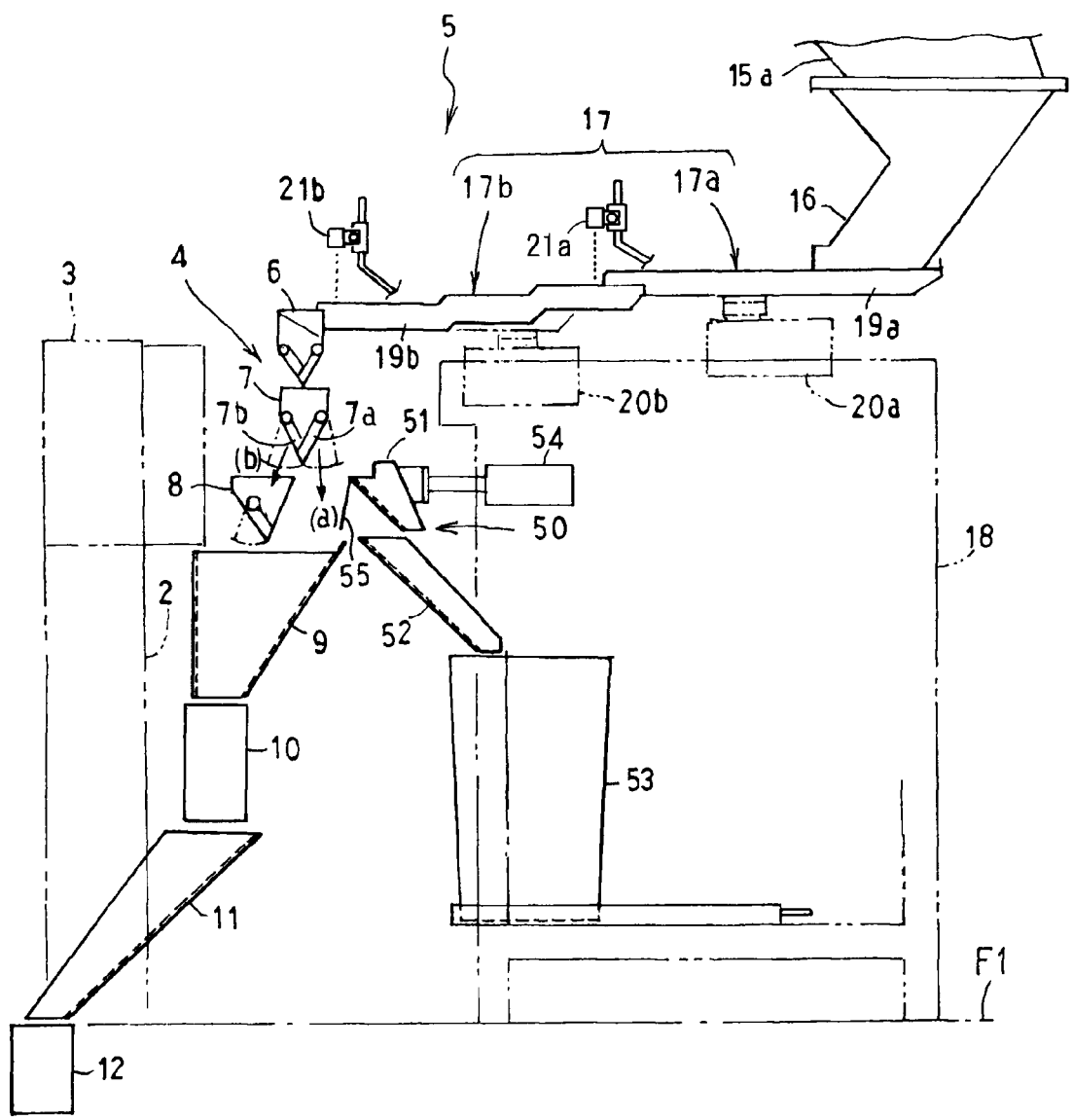
FIG. 5 is a side view of principal components of the weighing device.

As illustrated in FIG. 5, the weighing units 4 are essentially configured as in the known art. The weighing units 4 each include a supply hopper 6, a weighing hopper 7, and a memory hopper 8. These hoppers 6, 7 and 8 are vertically disposed in a row and respectively have gates adapted to open and close. The supply hopper 6 receives articles transported from the article supplier 5 and then temporarily retains and discharges the received articles. The weighing hopper 7 retains the articles discharged from the supply hopper 6 and then weighs and discharges the retained articles. The memory hopper 8 receives the articles weighed by and discharged from the weighing hopper 7 and then temporarily retains and discharges the received articles.

The supply hopper 6, weighing hopper 7, and memory hopper 8 are detachably fitted to the base 3. In the base 3 are housed such devices as a mechanism to open and close the gates of these hoppers 6, 7 and 8 and a weight sensor used to measure the weights of the weighing hoppers 6.

The bases 3 each including eight weighing units are supported in upper parts of the support frame 2 in a manner that these bases are each pivotable around a fulcrum "p" vertically extending at one lateral end. When the base 3 is moved to pivot toward the central passage R, as illustrated with a virtual line in FIG. 2, to have the weighing units 4 exposed to a large extent, the hoppers and other components may be easily attached and detached to and from the base 3 for maintenance and other purposes. Structural features that allow the bases 3 to be pivotably supported will be described later in detail.

As illustrated in FIG. 5, the weighing hopper 7 has, at its lower end, an outer gate 7a and an inner gate 7b that are adapted to independently open and close. When the outer gate 7a alone is oscillated to open, the weighed articles are discharged directly into a first collection chute 9 disposed below through a first outgoing path (a). When the inner gate 7b alone is oscillated to open, the weighed articles are discharged into the memory hopper 8 through a second outgoing path (b) and are temporarily retained in the memory hopper 8.

The weighing units 4 are each equipped with a memory hopper 8. These memory hoppers 8, as well as the weighing hoppers 7, may be allowed to participate in combinatorial computations. Thus, more hoppers may be available for combinatorial computations (available hoppers).

At positions below the weighing hoppers 7 and the memory hoppers 8, four first collection chutes 9 are disposed in a row in the lateral direction. These first collection chutes 9 collect the articles dropping downward from the weighing hoppers 7 or the memory hoppers 8 determined and selected as having a predetermined combined weight by the combinatorial computations. Two first collection hoppers 10 are each disposed at a position below two adjacent ones of the first collection chutes 9. These first collection hoppers 10 temporarily receive and retain the articles collected by the first collection chutes 9. Second collection chutes 11 are disposed at positions below the first collection hoppers 10. These second collection chutes 11 guide and collect the articles dropping downward from the first collection hoppers 10. In a respective one of the weighing apparatuses 1A and 1B, a second collection hopper 12 is disposed at a position below the second collection chutes 11. In the second collection hopper 12 are gathered together and temporarily retained the articles weighed and collected by the 12 weighing units 4.

As illustrated in FIG. 1, a final collection hopper 13 is disposed at a position down below the central passage R. In the final collection hopper 13 are gathered together the articles discharged from the second collection hoppers 12 of both of the weighing apparatuses 1A and 1B. This final collection hopper 13 is opened and closed in response to a supply request instruction outputted from the packaging apparatus. A metal detector 14 is disposed in a guiding path through which the articles are dropping downward from the second collection hopper 12 into the final collection hopper 13. The metal detector 14 monitors whether the articles are contaminated with any metallic foreign matter.

The article supplier 5 has retaining tanks 15 in which the articles are retainable and further has retaining hoppers 16 and 12 linear feeders 17. The retaining hoppers 16 are continuous to lower ends of the retaining tanks 15. The linear feeders 17 are disposed next to each other in the lateral direction at positions above a support table 18. The linear feeders 17 vibrationally transport the articles dropping downward from lower ends of the retaining hoppers 16 into the 12 weighing units 4.

The retaining tanks 15 include a lower-stage tank 15a, a mid-stage tank 15b, and an upper-stage tank 15c. The lower-stage tank 15a is fitted into and supported by the opening of a second floor surface F2 located at a position way above the first floor surface F1. The mid-stage tank 15b is detachably and supportably fitted to an upper part of the lower tank 15a, and the upper-stage tank 15c is attached likewise to an upper part of the mid-stage tank 15b. The retaining hopper 16 is detachably and supportably coupled to a lower end of the lower-stage tank 15a.

As illustrated in FIG. 5, the linear feeder 17 includes an upstream linear feeder 17a and a downstream linear feeder 17, which are respectively disposed on upstream and downstream sides in the direction of transport of articles. The upstream linear feeder 17a and the downstream linear feeder 17b are disposed in tandem, with the upstream linear feeder being located at an upper position than the downstream one, like a stepwise slope directed downward. These linear feeders 17a and 17b respectively have troughs 19a and 19b and vibration generating mechanisms 20a and 20b. The troughs 19a and 19b are shaped in the form of a groove in cross section. The vibration generating mechanisms 20a and 20b are disposed at upper positions of the support table 18. The troughs 19a and 19b are detachably coupled to vibration heads of the vibration generating mechanisms 20a and 20b.

The articles thrown out of the retaining hopper 16 into the upstream linear feeder 17a are vibrationally transported and thereby loosened into pieces, and then flow into the downstream linear feeder 17b. Then, the articles are thrown, in a small quantity at a time, out of the article-outgoing end of the downstream linear feeder 17b into the supply hopper 6 of the weighing unit 4. Article sensors 21a and 21b are disposed at positions above the linear feeder 17. These article sensors 21a and 21b may detect, using, for example, laser, heights of the articles piled up at the article-incoming end and the article-outgoing end of the downstream linear feeder 17b. The vibration generating mechanisms 20a and 20b are driven to generate vibration based on information of article detection outputted from the article sensors 21a and 21b, so that the linear feeders 17 are each allowed to uniformly transport the articles.

The tanks and feeders described thus far may be standard-spec components used to supply articles that hardly stick together like nuts, bean snacks, and cubic rice crackers. Some of the linear feeders 17 used to transport, in a small quantity at a time, sticky articles like small rice crackers or small fishes cooked in mirin, and retaining tanks 15 used with such linear feeders are configured differently to the standard-spec ones. In the example described below, of the 12 linear feeders 17 arranged next to one another in the lateral direction, four linear feeders 17(C) on one end side in the lateral direction and a retaining tank 15(C) disposed correspondingly to these feeders are configured according to a specification that differs from the standard specification, as illustrated in FIGS. 2 to 4.

The different-spec retaining tank 15(C) is provided with a belt conveyer 35 having a large width. This belt conveyer is used to transport articles that may be difficult to smoothly flow downward under their own weights. The belt conveyer 35 is so disposed that is horizontally pivotable along a lower part of an upper tank 36 having a rectangular cylindrical shape, as illustrated in FIGS. 3 and 4. By thus driving the belt conveyer 35 to pivot, the articles retained at the bottom of the upper tank 36 may be forced out of the tank and allowed to widely flow downward into the retaining hopper 16 through the lower-stage tank 15a.

In the illustrated example, the retaining tank 15(C) of the weighing apparatus 1A and the retaining tank 15(C) of the weighing apparatus 1B are differently situated and installed. As for the retaining tank 15(C) of the weighing apparatus 1A, the belt conveyer 35 is driven to pivot in the front-back direction parallel to the direction of transport of articles by the linear feeders 17. As for the retaining tank 15(C) of the weighing apparatus 1B, the belt conveyer 35 is driven to pivot in the lateral direction orthogonal to the direction of transport of articles by the linear feeders 17.

The articles dropped and discharged from the article-outgoing end of the belt conveyer 35 are guided into the retaining hopper 16 through the lower-stage tank 15a. In the retaining tank 15(C) of the weighing device 1B illustrated in FIG. 4, the lower-stage tank 15a is embedded with an article split-and-guide member 37 in order to prevent that the articles widely flowing out of the article-outgoing end of the belt conveyer 35 are transported to an off-center position(s) in the lower-stage tank 15a. The article split-and-guide member 37 has a pair of split funnels 38 that are disposed next to each other in the direction of width of the belt conveyer 35. The articles, which are dropped and discharged widely along the belt width from the article-outgoing end of the belt conveyer 35 to an upper part of the lower-stage tank 15a, are guided by the two split funnels 38 of the article split-and-guide member 37 to flow downward and disperse in the direction in which the four linear feeders 17(C) are arranged.

As illustrated in FIG. 5, the support table 18 of the article supplier 5 has a reject mechanism 50 disposed to discharge the articles oversupplied into and received by the weighing hopper 6.

The reject mechanism 50 includes a reject chute 51, a collection chute 52 and a collection container 53. The reject chute 51 is allowed to horizontally move forward and backward. The collection chute 52 and the collection container 53 are used to collect the articles guided into the reject chute 51.

The reject chute 51 is disposed so as to face a first transport path (a) of the weighing hopper 7 from the outer front side. The reject chute 51 is driven by an air cylinder 54 to move toward and away from the first transport path (a). At normal times, the reject chute 51 retreats to and stays at a position on the outer side of the first transport path (a), as illustrated in FIG. 5. Thus, the reject chute 51 may be prevented at normal times from interfering with discharge of the articles into the first collection chute 9 after the outer gate 7a of the weighing hopper 7 is opened.

In case a weight value measured by the weighing hopper 7 suggests an oversupply of the articles beyond a predetermined range of weights, the reject chute 51 moves to and stays on the first transport path (a), which is REJECT status. When the outer gate 7a of the weighing hopper 7 is opened during the REJECT status, the articles oversupplied into and received by the weighing hopper 7 are discharged into the reject chute 51 and dropped downward into the collection container 53 through the collection chute 52. After the articles are thus collected, the reject chute 51 moves to the original position away from the first transport path (a), and the weighing hopper 7, with the outer gate 7a being closed, is ready for the next combinatorial computations.

The reject chute 51 has, at its edge, a guide member 55 made of a plate material. The guide member 55 is at a position facing the first transport path (a) from the outer side when the reject chute 51 is retreated to and staying at the position on the outer side of the first transport path (a). At this position, the guide member 55 prevents the articles from flying off outward that are discharged from the weighing hopper 7 when the outer gate 7a is opened, so that the articles are properly guided into the first collection chute 9

FIGS. 6 to 11 are drawings that illustrate structural features of the weighing device that allow the bases 3 to be fixed and pivotably supported.

Figure 6:
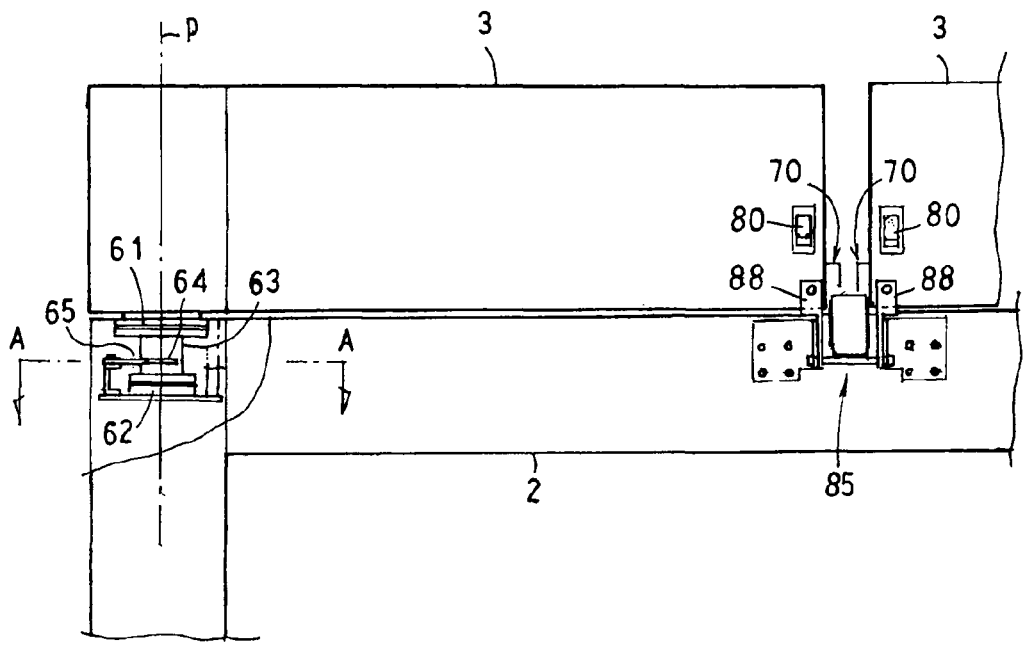
FIG. 6 is a partly-broken front view of a base supporting structure.

FIG. 6 is a partly-broken front view of the structural features that allow the bases 3 to be pivotably supported. As illustrated in FIG. 6, a cross roller bearing 61 and a torque hinge 62 are disposed around the fulcrum "p" of the base 3. The cross roller bearing 61, by supporting a lower part of a cylindrical pivoting shaft 63 to which a base end of the base 3 is coupled, may allow the cylindrical pivoting shaft 63 to smoothly pivot against all of possible loads, for example, bending moment load, radial load, and thrust load. This cross roller bearing 61 may ensure that the base 3 is pivotably supported by the support frame 2 at a lower position along the fulcrum "p". Further advantageously, the combination weighing device may be reduced in size as compared to, for example, a structure in which two or more any other bearings but the cross roller bearings are disposed at upper and lower positions of the cylindrical pivoting shaft 63 of the base 3.

The torque hinge 62 imparts a resistance torque against possible pivoting of the base 3 and may thereby allow the base 3 to stay at an optional non-pivotable position.

Figure 7:
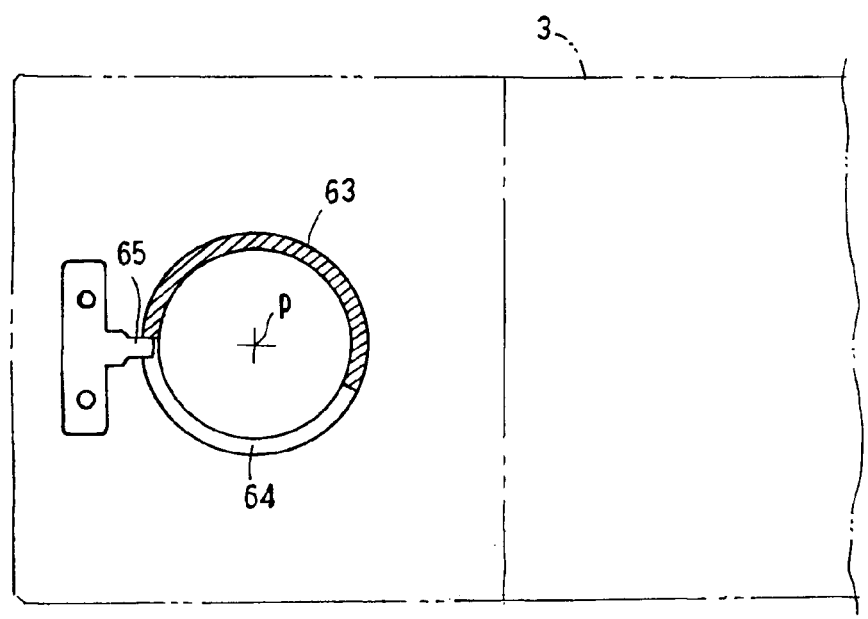
FIG. 7 is a cross-sectional view of FIG. 6 cut along A-A line.

As illustrated in FIG. 7 showing an A-A cross-sectional view of FIG. 6, a slit 64 is circumferentially formed in the outer circumference of the cylindrical pivoting shaft 63 of the base 3. An engageable metal fitting 65 is fixed to a support-frame (2) side of the cylindrical pivoting shaft 63, and this metal fitting 65 is fitted in and engaged with the slit 64. The base 3 is accordingly pivotable through a range of angular degrees including an area where the slit 44 is formed (for example, 150 degrees). The slit 64 and the engageable metal fitting 65 respectively formed in and fixed to the cylindrical pivoting shaft 63 of the base 3 constitute the pivotable range regulator described herein that defines a range of pivotable area of the base 3.

A locking mechanism 70 is disposed on a free-end side of the base 3 opposite to the fulcrum "p". This locking mechanism 70 is used to fixedly close the base 3 to a predetermined position.

Figure 8:
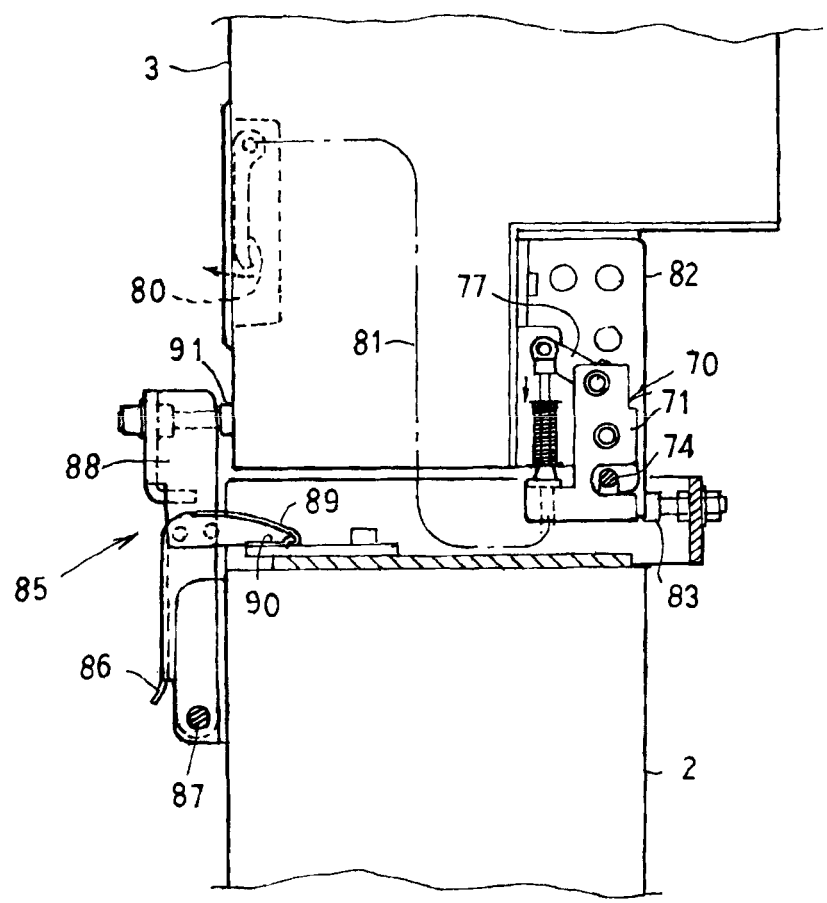
FIG. 8 is a side view of a locking mechanism when a base is being locked to a predetermined position.
Figure 9:
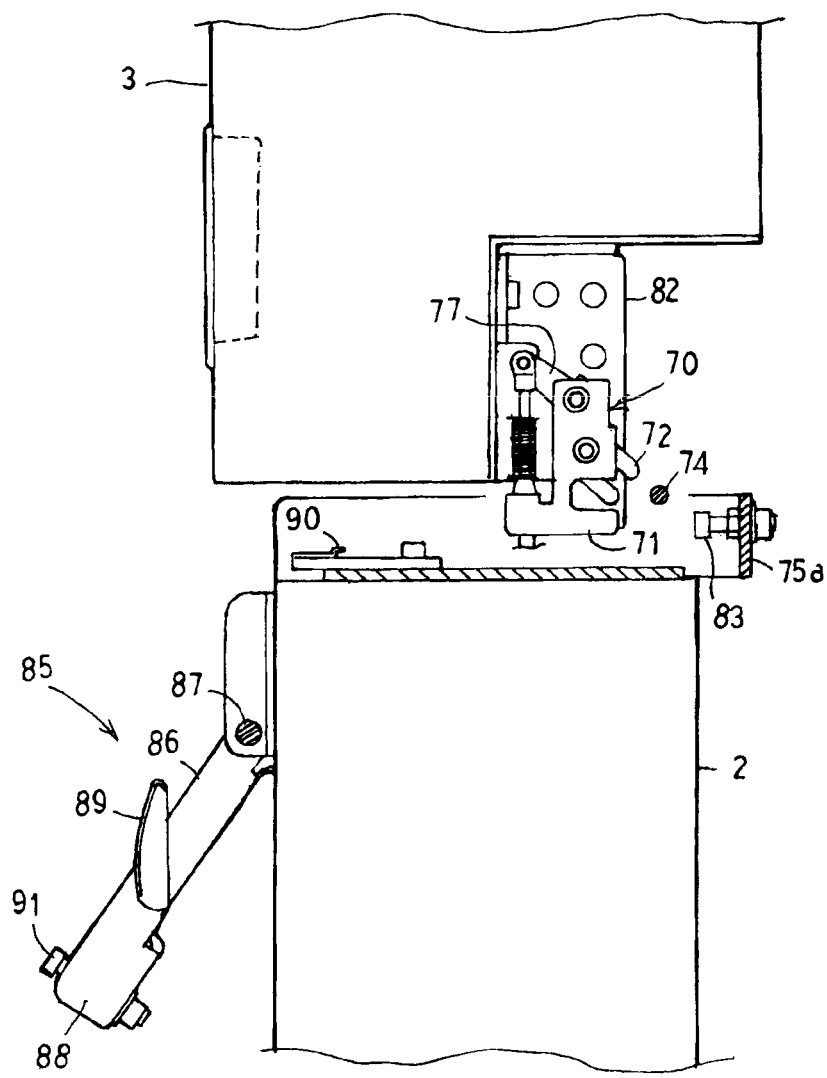
FIG. 9 is a side view of the locking mechanism when the base is being unlocked.
Figure 10A:
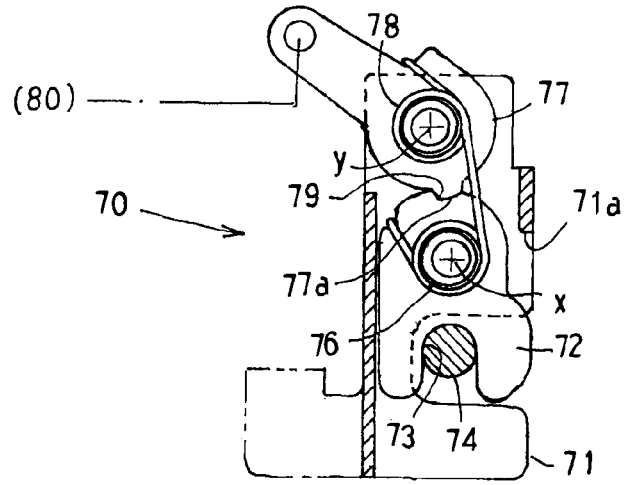
FIG. 10A is a side view of a based-locked state of the locking mechanism.
Figure 10B:
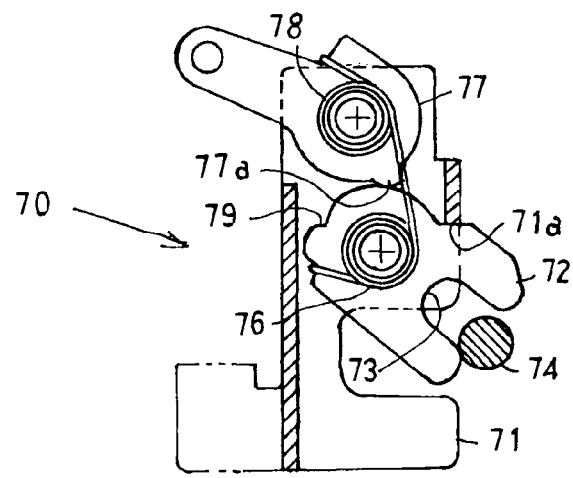
FIG. 10B is a side view of a base-unlocked state of the locking mechanism.
Figure 10C:
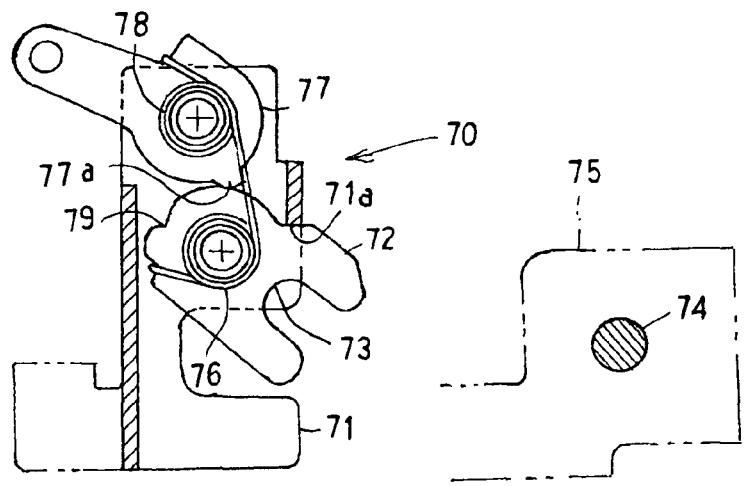
FIG. 10C is a side view of a base-movable state of the locking mechanism.

FIG. 8 is a side view of the locking mechanism 70 when the base 3 is being locked to a predetermined position which is a set position at which the combination weighing device is operational. FIG. 9 is a side view of the locking mechanism 70 when the base 3 is being unlocked. FIGS. 10A to 10C are side views illustrating steps of operating the locking mechanism 70, in which FIG. 10 shows a base-locked state, FIG. 10B shows a base-unlocked state, and FIG. 10C shows a base-movable state.

Figure 11:
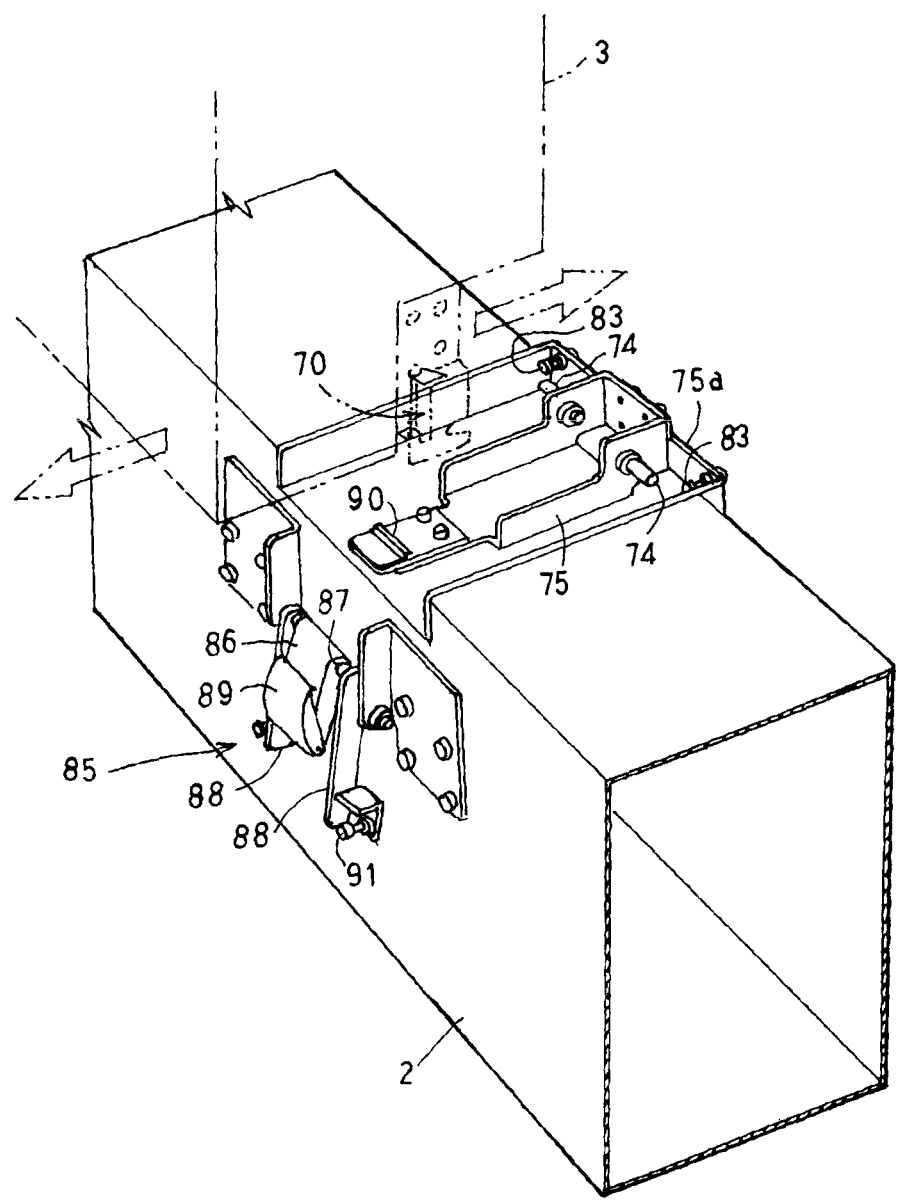
FIG. 11 is a perspective view of a free-end side of the base.

As illustrated in FIGS. 10A to 10C, the locking mechanism 70 may be a latch mechanism of the known art. A locking metal fitting 72 is pivotably supported around a horizontal extending fulcrum "x" by a case 71 fixedly coupled to an end surface of the base 3. An engageable recess 73 formed in the locking metal fitting 72 is engaged with an engageable pin 74 horizontally fixed on the support-frame (2) side to allow the base 3 to be secured to the predetermined position. In the paired bases 3 that are pivotable as in a pair of French windows, the engageable pins 74 of the locking mechanism 70 are both attached to a bracket 75 bonded to an upper surface at the lateral center of the support frame 2, as illustrated in FIG. 11.

The locking metal fitting 72 is biased by a torsion spring 76 and is thereby pivotable in a certain direction (anticlockwise direction in FIGS. 10A to 10C). The locking metal fitting 72 in a free state is biased to contact a bending stopper piece 71a formed in the case 71 and thereby keeps a certain standby position. The case 71 has, at its upper part, an engageable metal fitting 77. This engageable metal fitting 77 is engageable with the outer circumference of a boss of the locking metal fitting 72 and is pivotable around a horizontal fulcrum "y". Further, the engageable metal fitting 77 is biased by a torsion spring 78 formed continuous to the torsion spring 76 and is thereby pivotable in a direction opposite to the locking metal fitting 72 (clockwise direction in FIGS. 10A to 10C).

The locking metal fitting 72 has, in the outer circumference of its boss, an engageable step 79 acted upon by an engageable protrusion 77a of the engageable metal fitting 77. When the locking metal fitting 72 is taking the standby position, the engageable metal fitting 77 is biased and thereby stays in contact with the outer circumference of the boss of the locking metal fitting 72 at a position beyond the engageable step 79. When the locking metal fitting 72 is prompted to pivot by an external force against the torsion spring 76, the engageable recess 73 is directed immediately downward; i.e., locking position. Then, the engageable protrusion 77a of the engageable metal fitting 77 is biased and thereby engaged with the engageable step 79. This may block the locking metal fitting 72 from returning to the standby position even after this meta fitting is no longer acted upon by the external force, allowing the locking metal fitting 72 to keep the locking position.

The other end side of the engageable metal fitting 77 is connected, with a wire 81, to a lock release knob 80 disposed on a front surface on the free-end side of the base 3, as illustrated in FIG. 8. When the lock release knob 80 is pulled outward and oscillated, the engageable metal fitting 77, receding and pivoting against the torsion spring 78, is allowed to disengage from the locking metal fitting 72.

The locking mechanism 70 is attached to an end surface of the base 3 through a spacer 82 made of a thick plate material. Stopper bolts 83, which are directed toward the central passage R, are attached to a bracket extension 75a continuous to the bracket 75 disposed for attachment of engageable pins When the base 3 is at the predetermined position, the stopper bolt 83 is butted against an end part of the spacer 82 and is thereby positionally located, as illustrated in FIG. 8. At the time, the locking metal fitting 72 of the locking mechanism 70 is engaged with the engageable pin 74; i.e., locking position.

A clamping mechanism 85, operable like a toggle, is disposed in an upper part of the support frame 2 on the central-passage (H) side. The clamping mechanism 85 has an operation lever 86 operable beyond the dead center, a clamping metal fitting 88 continuous to the operation lever 86 through a support shaft 87, and a clamping spring 89 in which a leaf spring is used. A fixing hook 90, which is a corresponding member of the lamping spring 89, is set at a position on the upper surface of the support frame 2.

While an edge of the clamping spring 89 is being engaged with the fixing hook 90, the operation lever 86 is oscillated downward beyond the dead center. In response to this action, the clamping metal fitting 88 is biased through the clamping spring 89, and the front surface of the base 3 is elastically pressed backward, i.e., in a direction in which the base 3 is no longer pivotable by the stopper bolt 91 at an edge of the clamping metal fitting 88. As a result, the base 3 locked at the predetermined position may be elastically nipped between the front and back stopper bolts 83 and 91, which may prevent forward and backward vibrations of the base 3.

The clamping mechanism 85 is shared and used for two bases 3 adjacently disposed in the lateral direction. Clamping metal fittings 88 are formed on right and left sides of the operation lever 86 which is also shared and used for two bases.

The pivoting movement of the base 3 is hereinafter described.

To allow the base 3 to pivot from the predetermined position, the operation lever 86 of the clamping mechanism 85 is moved forward and upward beyond the dead center. When the clamping spring 89 is then released from the fixing hook 90, the clamping metal fitting 88, together with the operation lever 86, may be receded outward and downward, as illustrated in FIG. 9. Thus, the base 3 may no longer be subjected to a pressing force acted thereupon by the stopper bolt 90 from the front side.

Next, the lock release knob 80 is pulled to disengage the locking metal fitting 72 from the engageable metal fitting 77. The locking metal fitting 72 is then pivotably biased to take the standby position and pivots toward the fixed engageable pin 74. As a result, the free-end side of the base 3 is slightly pushed relatively forward (central-passage (R) side). The base 3 is then manually forced to pivot to an optional position and is thereby widely opened. Then, the hoppers and other components may be easily attached to and detached from the base 3 for maintenance and other purposes.

After cleaning and/or maintenance is over, the opened base 3 is forced to pivot to the predetermined position. Then, the locking metal fitting 72 at the standby position is first engaged with and contact the engageable pin 74. When the base 3 is then strongly pushed to pivot until contact is made with the stopper bolt 83, the locking metal fitting 72 in contact with the engageable pin 74 relatively pivots against the torsion spring 76, and the locking metal fitting 72 is automatically engaged with the engageable metal fitting 77 and is thereby locked.

Then, the operation lever 86 of the clamping mechanism 85 is lifted upward so that the clamping spring 89 is engaged with the fixing hook 90, and the operation lever 86 is moved downward beyond the dead center. Thus, the base 3, with its front surface being biased backward by the stopper bolt 91 of the clamping metal fitting 88, may be secured to the predetermined position in a vibration-preventable manner.

According to this embodiment, the weighing units 4 arranged next to each other in the base 3 may be exposed to a large extent by having the base 3 pivot from its predetermined position. This may facilitate cleaning and maintenance operations for the hoppers and other components of these weighing unit 4.

The base 3, which is unaffected by weights of the article-retainable tanks and linear feeders, may be readily pivotable.

The base 3 may be fixable to the predetermined position in a vibration-preventable manner, which may ensure that combinatorial computations are performed with high accuracy.

Other Embodiments

The present invention may be feasible as described below.
1) The self-lockable locking mechanism 70 may be disposed on the support-frame (2) side, while the engageable pin 74 may be disposed on the base (3) side.
2) As an easier option, the free-end part of the base 3 at the predetermined position may be securely fastened to the support frame 2 with a handle-attached bolt or a knob-attached bolt.

3) The self-lockable locking mechanism 70 may be selected from various known structures other than the locking metal fitting 72 structurally pivotable as described in the earlier embodiment. For example, the self-lockable locking mechanism 70 may be a member linearly slidable to engage with and disengage from an engageable pin or hole.

4) The combination weighing device may further include a means that detects whether the base 3 is currently at the predetermined position, and a fail-safe function that allows the weighing operation to be performed only when the base 3 is determined as being correctly located at the predetermined position.

5) The combination weighing device may have the clamping mechanism 85 for each of the bases 3.

REFERENCE SIGNS LIST

2 support frame
3 base
4 weighing unit
6 supply hopper
7 weighing hopper
70 locking mechanism
85 clamping mechanism
88 clamping metal fitting

The invention claimed is:

1. A combination weighing device, comprising:
    a plurality of weighing units each comprising a weighing hopper, the plurality of weighing units being arranged next to each other; and
    a base having a long shape in a horizontal direction, the base being mountable with the plurality of weighing units and being mounted a single vertical rotatable cylindrical shaft situated at one end of the base in the horizontal direction and configured to pivot the base relative to the weighing units.

2. The combination weighing device according to claim 1, further comprising a cross roller bearing that supports the vertical rotatable cylindrical shaft, the cross roller bearing being disposed at a position below the one end in the horizontal direction.

3. The combination weighing device according to claim 1 or 2, further comprising a torque hinge allowed to hold the base at an optional pivoting position.

4. The combination weighing device according to claim 1 or 2, further comprising a pivotable range regulator that regulates a range of pivotable area of the base.

5. The combination weighing device according to claim 3, further comprising a pivotable range regulator that regulates a range of pivotable area of the base.

6. The combination weighing device according to claim 1 or 2, further comprising two bases configured similarly to the base, the two bases being disposed next to each other in a row in the horizontal direction and being pivotable as in a pair of French windows.

7. The combination weighing device according to claim 3, further comprising two bases configured similarly to the base, the two bases being disposed next to each other in a row in the horizontal direction and being pivotable as in a pair of French windows.

8. The combination weighing device according to claim 1 or 2, further comprising a self-lockable locking mechanism that securely engages the base to a predetermined position.

9. The combination weighing device according to claim 3, further comprising a self-lockable locking mechanism that securely engages the base to a predetermined position.

10. The combination weighing device according to claim 8, further comprising a clamping mechanism that elastically presses, using a clamping tool, the base currently at the predetermined position in a direction in which the base is no longer pivotable.

11. The combination weighing device according to claim 9, further comprising a clamping mechanism that elastically presses, using a clamping tool, the base currently at the predetermined position in a direction in which the base is no longer pivotable.

12. The combination weighing device according to claim 10, wherein
    the clamping mechanism is shared and used for two bases configured similarly to the base, the two bases being arranged next to each other in a row in the horizontal direction.

13. The combination weighing device according to claim 11, wherein
    the clamping mechanism is shared and used for two bases configured similarly to the base, the two bases being arranged next to each other in a row in the horizontal direction.

* * * * *